UNITED STATES PATENT OFFICE.

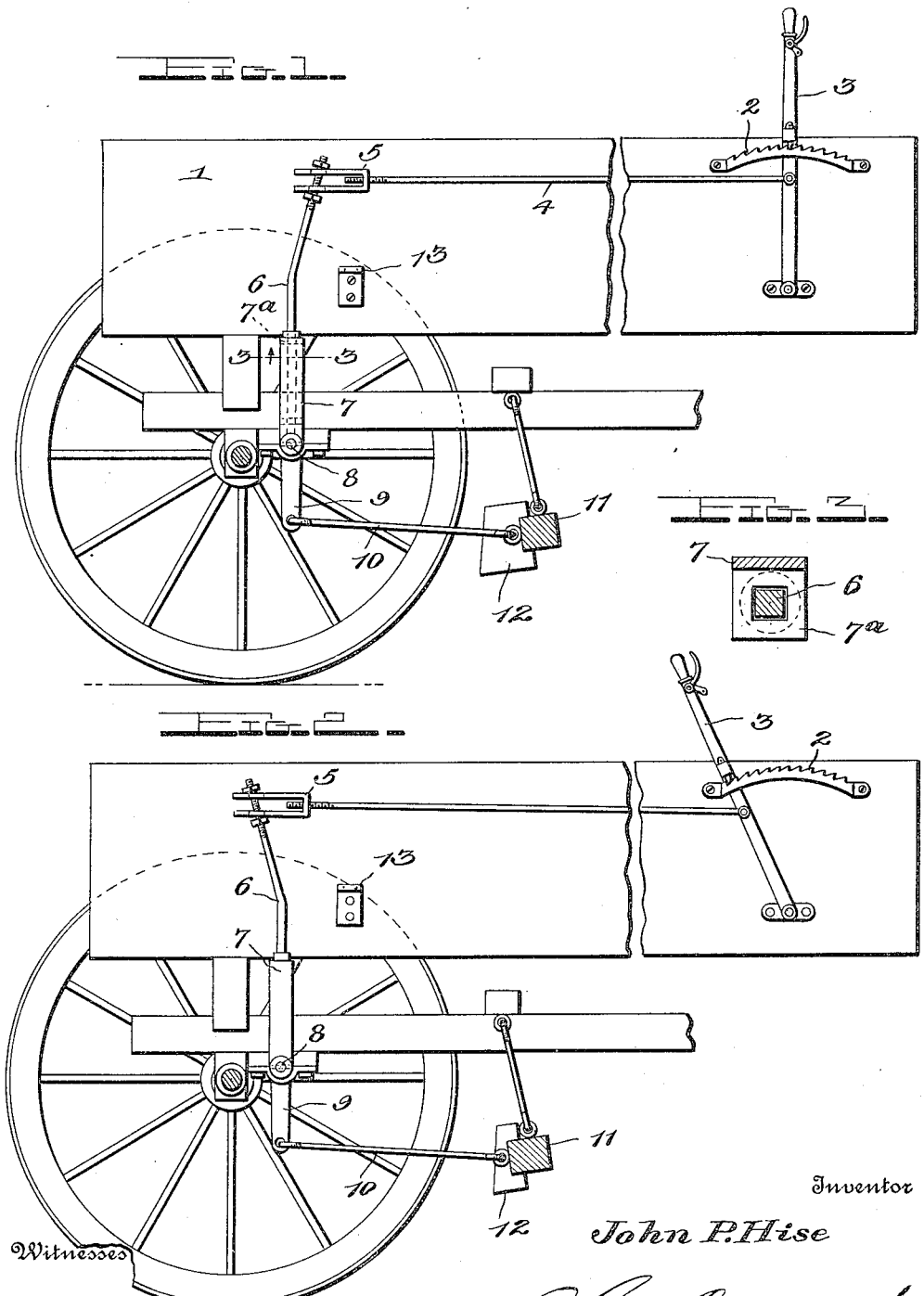

JOHN PAUL HISE, OF HIGHTOWN, VIRGINIA, ASSIGNOR TO THE HISE WAGON BRAKE COMPANY, OF MARLINTON, WEST VIRGINIA, A CORPORATION OF WEST VIRGINIA.

WAGON-BRAKE.

1,151,879.  Specification of Letters Patent.  Patented Aug. 31, 1915.

Application filed October 17, 1913. Serial No. 795,775.

*To all whom it may concern:*

Be it known that I, JOHN P. HISE, a citizen of the United States, residing at Hightown, in the county of Highland and State of Virginia, have invented a new and useful Improvement in Wagon-Brakes, of which the following is a specification.

This invention relates to an improvement in wagon brakes and relates especially to the construction of the brake operating lever to which the pull rod is connected. In ordinary practice the rubber of the brake shoe can only be used until it is about one-half worn, at which time the brake will cease to lock. It then becomes necessary to replace the rubber or to face it up but this requires new material for the rubber, and the having at hand tools which a teamster does not usually have at hand when needed. The object of my invention is to save time, expense and labor and to enable a worn rubber to be used until entirely gone, and this object is obtained without making any change whatever in the construction of the present brake shoe.

The invention consists of the novel features of construction hereinafter described, pointed out in the claim and shown in the accompanying drawing, in which:

Figure 1 is a side elevation of a brake mechanism with my invention applied thereto. Fig. 2 is a similar view showing the lever reversed for use with a worn shoe. Fig. 3 is a section upon the line 3—3 of Fig. 1.

In these drawings 1 represents the wagon bed having the usual rack 2 over which operates an ordinary hand lever 3 of any desired kind. The pull rod 4 has threaded upon its rear end a forked strap or furl 5 within which is pivotally and movably secured to the upper end of an angled brake operating lever 6. This lever feeds loosely in a suitable upright socket 7 carried by a rotatable rod 8, said rod having a depending arm 9 connected by a link 10 to a swinging bracket rod 11 which carries the shoes 12.

The essential feature of this invention is the removable angled lever 6. This lever feeds loosely in the upright socket 7, which as shown consists of a flat bar pivoted with lugs 7ª having square openings through which the lower portion of the lever 6 extends. When used in connection with a normal brake shoe the lever 6 is adjusted so that the upper portion extends forwardly, and the throw of the hand lever 3 is through one-half of the arc of the rack 2. When the brake shoe becomes half worn down and ceases to lock instead of replacing it or facing it up it is simply necessary to disengage the lever 6 from the socket 7 give it a half rotation in the strap 5, and then drop it back into the socket. This throws the parts into the position shown in Fig. 2 and the brake shoe would then lock as tightly as when new.

Preferably the lever 6 is swiveled or otherwise rotatably connected to the furl 5, although if desired it could be pinned to said furl, the pin being removed when the lever is to be reversed. I also place upon a wagon bed a slotted brake 13 and when the bed is removed from the running gear instead of having to disconnect the lever 6 from the pull rod it is simply lifted from the socket 7 and dropped into position in the brake 13, thereby keeping said lever always connected to the wagon bed and to the parts carried thereby.

What I claim is:—

The brake mechanism comprising a lever receiving socket operatively connected to a brake beam, a brake lever loosely resting in said socket and having its upper portion normally angled forwardly, a hand operated pivoted lever, a rack over which said lever works, a pull rod extending rearwardly from the hand lever, and means for pivotally connecting said pull rod to the upper portion of said angled lever, said lever being reversible in the socket so as to throw the angled portion toward the rear upon wearing of the brake shoe.

JOHN PAUL HISE.

Witnesses:
EDWIN B. JONES,
J. H. PRUITT.